Dec. 15, 1931.  E. M. CROSLAND  1,836,361
PLANT FOR MANUFACTURE OF BISCUITS
Filed March 31, 1930  6 Sheets-Sheet 1
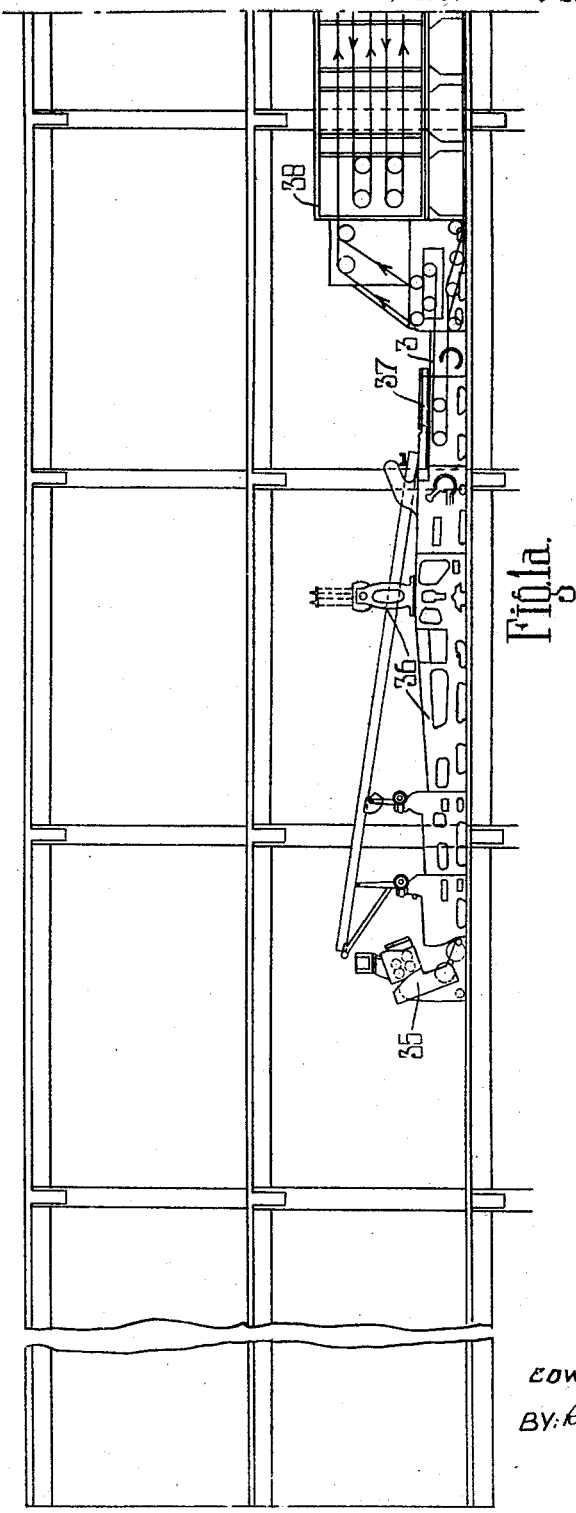
INVENTOR
EDWARD MILNER CROSLAND
BY: Ruege, Boyce & Bakelar
ATTORNEYS

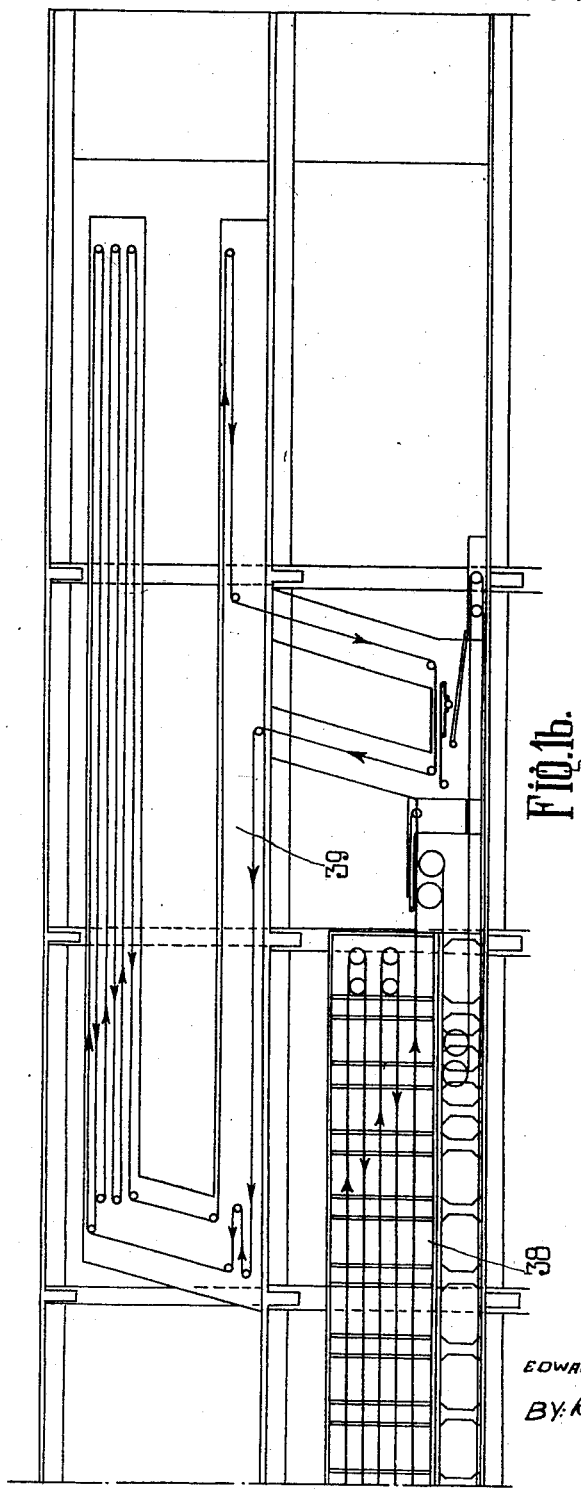

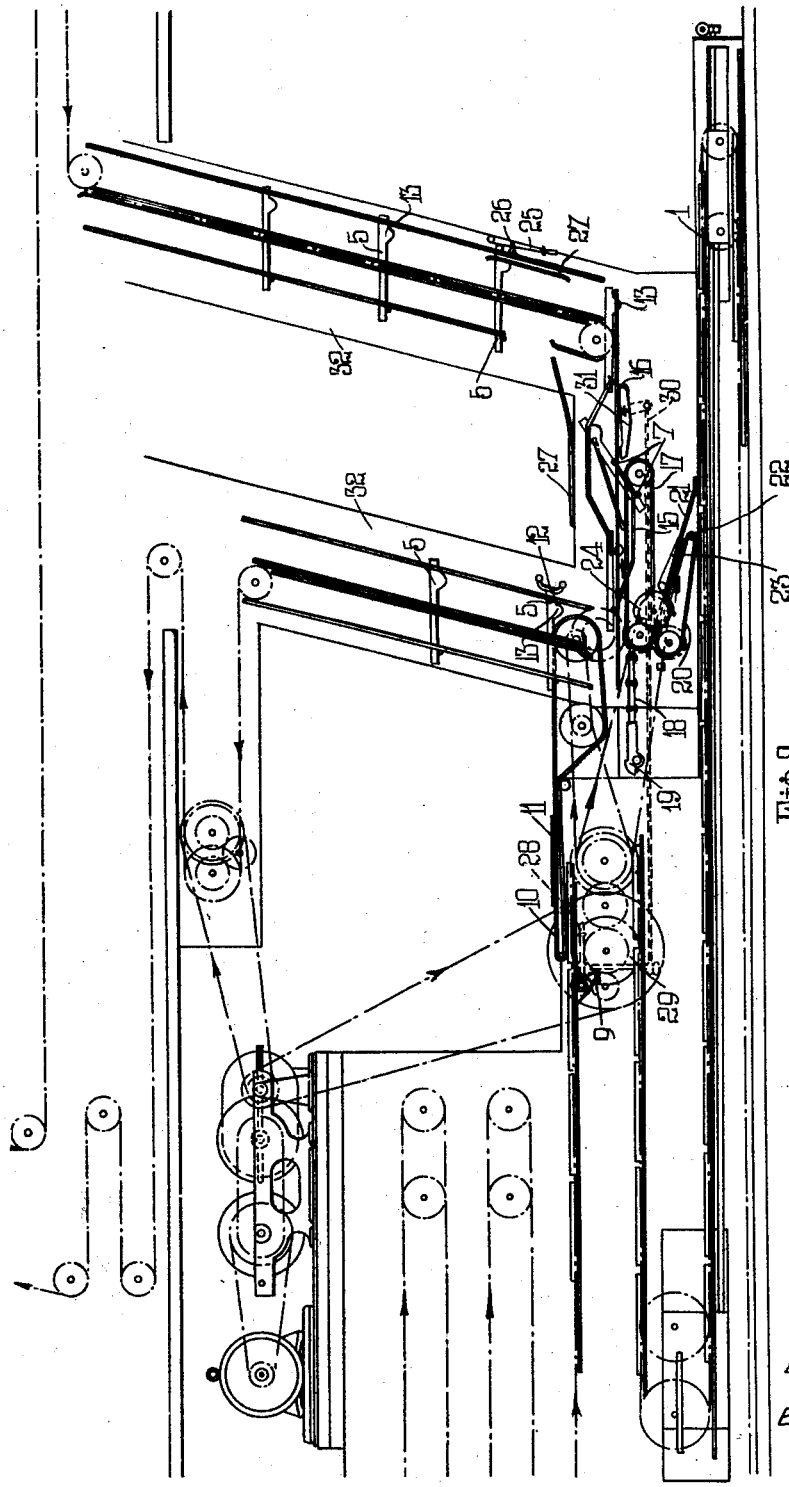

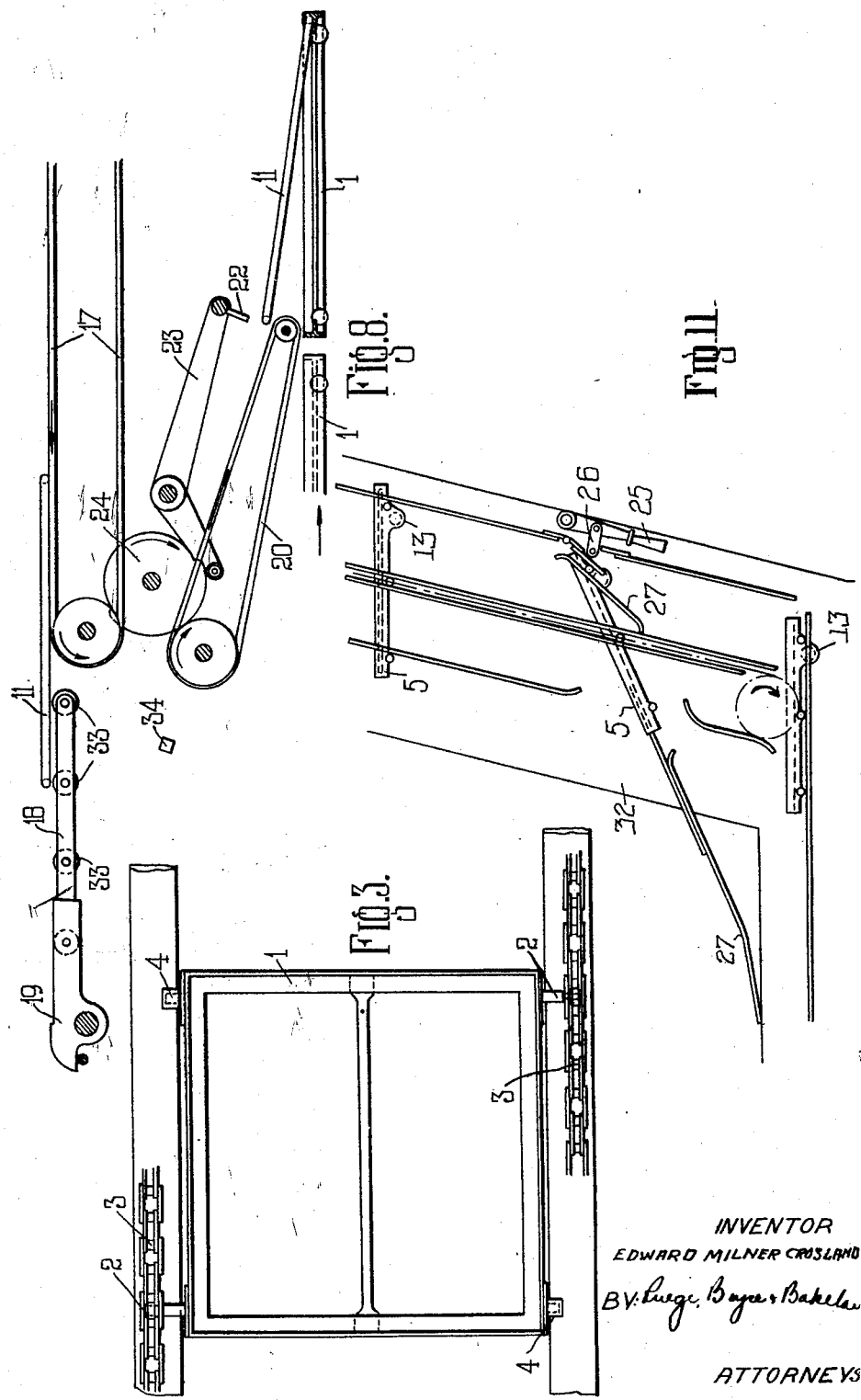

Dec. 15, 1931.  E. M. CROSLAND  1,836,361
PLANT FOR MANUFACTURE OF BISCUITS
Filed March 31, 1930  6 Sheets-Sheet 5
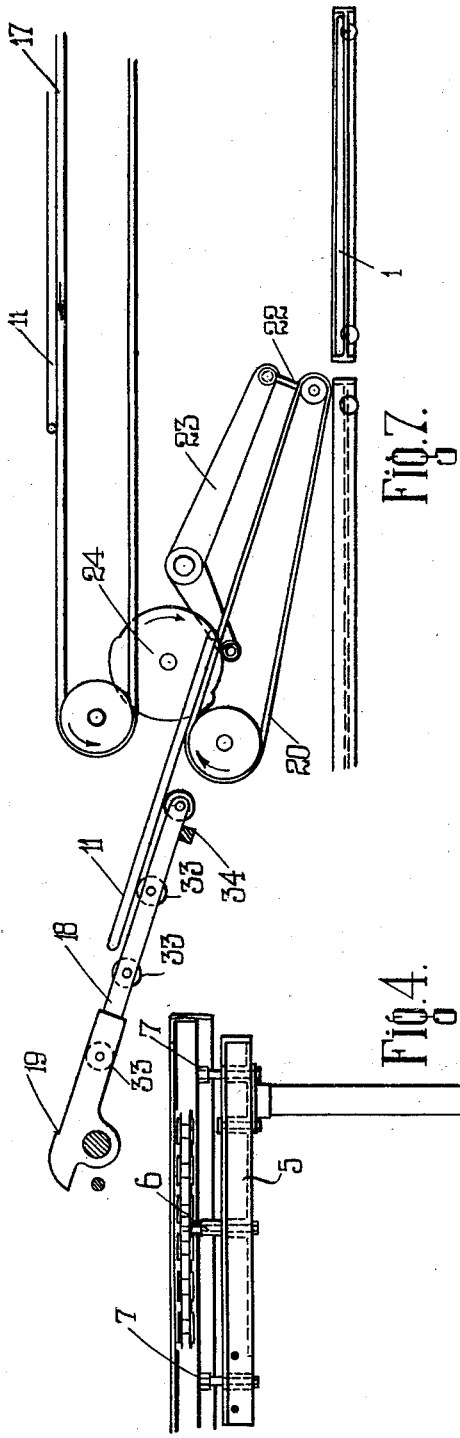
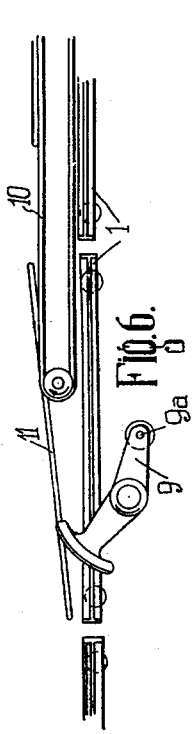
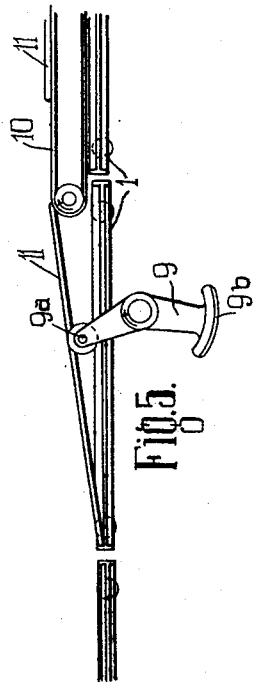
INVENTOR
EDWARD MILNER CROSLAND
ATTORNEYS Dec. 15, 1931.  E. M. CROSLAND  1,836,361
PLANT FOR MANUFACTURE OF BISCUITS
Filed March 31, 1930  6 Sheets-Sheet 6
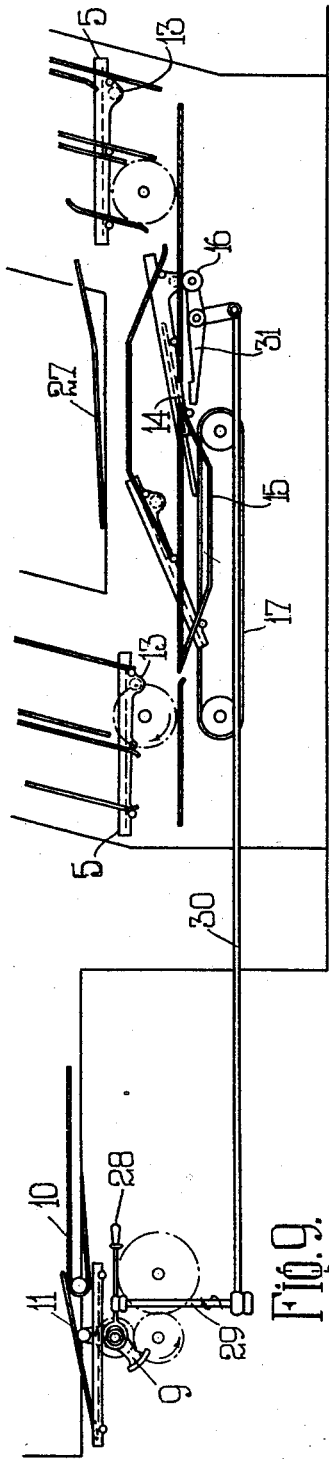
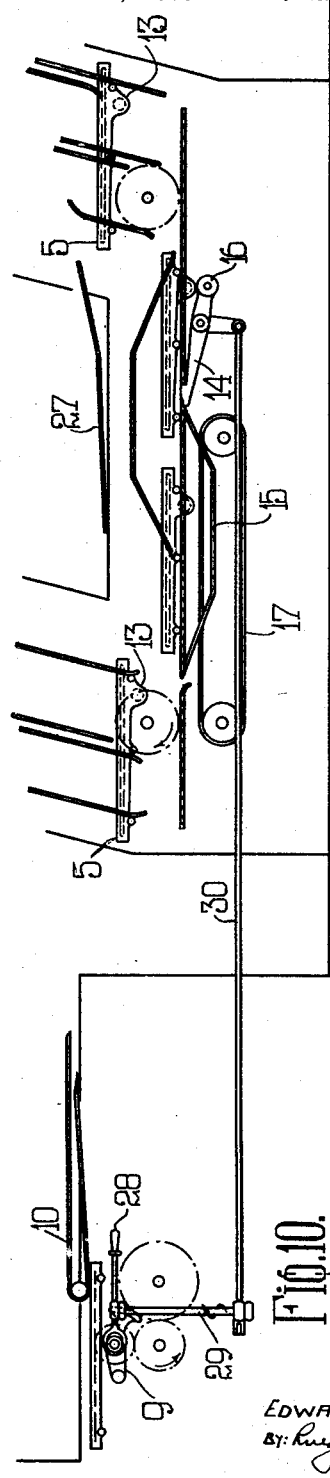
INVENTOR:
EDWARD MILNER CROSLAND
BY: Ruege, Boyer + Babeler
ATTORNEYS.

Patented Dec. 15, 1931

1,836,361

UNITED STATES PATENT OFFICE

EDWARD MILNER CROSLAND, OF NEWTON-LE-WILLOWS, ENGLAND

PLANT FOR MANUFACTURE OF BISCUITS

Application filed March 31, 1930, Serial No. 440,240, and in Great Britain April 2, 1929.

The present invention relates to the manufacture of biscuits.

Several methods are in use at the present time for the manufacture of biscuits. In one method, the material after being cut and embossed, is automatically placed in regular formation on to pans of various forms which are previously placed by hand in the cutting and embossing machine. The pans are then manually transferred from the cutting and embossing machine to the oven and are carried through the oven on moving chains. When the baking process has been completed the pans are transferred by hand to racks or conveyors so that the biscuits may be cooled before being packed.

This method of manufacturing biscuits possesses disadvantages in that manual labour is required for placing the empty pans into a biscuit cutting or embossing machine and after they are filled with cut dough pieces, transferring by hand from the machine to the oven and from the oven to the cooling racks, or conveyors. In addition to this, manual labour is often required to transport the empty pans from which the baked biscuits have been removed back to the embossing or cutting machine.

This labour is arduous, particularly at the delivery end of the oven where the pans are so hot that careful protection of the hands of the operator is required whilst further, the arduous work tending to produce exhaustion of the operators renders it necessary for such operators to work in relays.

In certain cases these difficulties have been overcome by substituting automatic and mechanical transference of the pans for the manual transference referred to above. In such cases, the oven chains are extended or additional chains or the like conveyors are provided in order to allow the hot pans to travel a comparatively lengthy distance after leaving the oven so that cooling of the biscuits can be effected before these are removed from the pans, and the pans also are cool before these are handled.

This method possesses advantages over the first because hot pans are not handled. However, labour is required to put the pans into the machine and to transport the pans from which the biscuits have been packed, back to the machine.

Further, a method of manufacture is also adopted involving the use of travelling chains which extend completely through the cutting machine, oven and cooling flight, the chains being common to all three. These chains usually carry means such as a cradle for conveniently holding each pan and in this apparatus the machine which embodies the cutter, embosser and panning unit, together with the oven and cooler, are synchronized as one unit.

This method of manufacture however, also possesses a number of disadvantages, the most important of which is that owing to the length of chain employed this must necessarily be of substantial design. Further, as each chain is common to both the oven and cooler, and a considerable amount of metal is utilized to form the chain itself, and in the construction of the cradles carrying the pans, it will be seen that the cooler in addition to its effect on the biscuits, must have a similar effect on the chains and cradles with the result that a great loss in efficiency and in effective heat, cannot be prevented.

Also as a direct result of this, the cooling section of the plant has to be greater than would normally be the case.

A further disadvantage of this construction is that as the conveyor chains are common to the machine, oven and cooler, the whole must necessarily work as one unit, and one of the three cannot be stopped or started without the others.

The present invention has for its object the utilization of the advantages of the known constructions and the elimination of their disadvantages.

According to the present invention, a conveyor is provided which is common to the cutting and embossing machine and the oven whilst a separate conveyor is provided for the purpose of cooling the biscuits and also if desired, to allow for removal and packing of the biscuits, automatic means being provided for transferring the pans containing the material from the oven conveyor to the cooler.

The hot pans carrying the biscuits are automatically and mechanically removed from cradles on the oven conveyor and placed on cradles on the cooling conveyor, whilst after the biscuits have been cooled and taken off the pans, means are provided whereby the empty pans are automatically re-transferred from the cooling conveyor to the oven conveyor. This eliminates both manual transference of the goods and also the necessity of heating and cooling the chains together with the cradles carrying the pans. It does not, of course, eliminate the necessity of cooling the pans as obviously, each pan proceeds through the oven, then through the cooler and thence back again through the machine and oven. As, however, the material forming the pans is of considerably less mass than that of the chains or cradles, intermittent heating and cooling of the pans does not result in any considerable loss of efficiency.

Furthermore an additional advantage is obtained over the automatic plant where the chains are common to both oven and cooler, inasmuch as two different types of conveyor may be used; it will be obvious that with mechanism operating conveyor chains in the oven where such mechanism is subjected to considerable heat, there will be restrictions to the type of mechanism that can be employed. If the cooling section employs separate chains then mechanism of a more delicate nature which may include the use of springs etc. can be employed. Such a conveyor can be made more mobile and the cradles conveying the pans may be made to oscillate around a pivot so as to more readily discharge the pan on to the return section of the oven conveyor.

Means may be provided for synchronizing the running of the conveyor chains through the machine and oven with the chains running through the cooler so that at any time these may be run in unison.

The invention is more particularly described with reference to the accompanying drawings in which:—

Figures 1a and 1b are left and right-hand portions respectively in side elevation of a complete biscuit cutting, baking and cooling plant.

Figure 2 is a sectional elevation on an enlarged scale showing the transfer arrangement between oven and cooler.

Figure 3 is a plan view of a cradle forming part of the oven conveyor.

Figure 4 is a corresponding plan view of a cradle forming part of the cooling conveyor.

Figure 5 is a detail view showing transfer of pans from the oven conveyor to the cooler.

Figure 6 is a view similar to Figure 5 with the parts in a different position.

Figure 7 is a detail view showing transfer of the pans from the cooler conveyor to the oven conveyor.

Figure 8 is a similar view in a different position of the parts. Figs. 9 to 11 are detail views of the mechanism on a larger scale.

The cradles 1 (Figure 3) of the oven section of the plant are preferably of the known type, rectangular in form, with a pivot 2 at each longitudinal edge, the pivot at one side being adjacent the front edge of the cradle whilst the pivot on the other side is adjacent to the rear edge. These pivots engage with endless chains 3 and by them are conveyed in a circuitous path through the oven. Guide rollers 4 engage with the chain track or other guides so as to maintain the cradles in a horizontal position.

The cradles 5 (Figure 4), for the conveyor or cooler, and also if desired, the packing section of the plant, are preferably constructed of a frame work in the form of three sides of a rectangle. The pivots 6 are situated intermediate the longitudinal sides of the frames and engage with endless chains 8 which convey them through the cooling flights and or packing table, as the case may be. The cradle 5 may be swung about pivot 6, but normally is prevented from swinging by means of rollers 7 placed at each corner of the cradle which may contact with the chain track and keep the cradle in the horizontal position.

As the pans 11 (Figure 5) in the oven cradles 1 issue from the oven, lever 9 rotating in the correct time by means of a drive taken from the gear drive in the oven, contacts with its end 9a with the underside of the pan, lifting up the front edge so that in moving forward it rests on the conveyor band or chain 10, and as the cradle proceeds forward, the other end 9b of lever 9 lifts up the rear end of the pan 11 out of the cradle and transfers it wholly on to the conveyor band 10 (Figure 6). The conveyor band 10 carries the pan forward until its progress is arrested by stop 12 on the cooling conveyor (Figure 2). The pan is held in this position until picked up by the cradle 5 as it ascends the tower 32 of the cooling conveyor 10 (Figure 2).

After making the complete circuit through the cooler 32 the cradle 5 reaches a horizontal section in close proximity to the oven conveyor. In travelling along the projection 13 on cradle 5 catches on roller 16 and causes the rear end of the cradle to tip up, the front guide roller passing through the opening 14 in the chain track and under guide 15. This tilting of the cradle brings the sides of the cradle below a travelling conveyor band, or chain 17 which action extracts the pan 11 from the cradle 5 and delivers it on to swinging arms 18. After delivering the pan to the conveyor band 17 and swinging arms 18, the cradle guide rollers 7 passing along guide 15 allow the cradle to resume its normal horizontal position.

The pan 11 taken out of the cooling conveyor cradle is carried forward by conveyor band 17 (Figures 2 and 7), and is delivered on to swinging arm 18. This arm has a series of rollers 33 on it to allow for the easy passage of the pan 11 across it, and it is balanced by springs and weights so as to support only a proportion of the pan's weight. The pan 11 is stopped by abutment 19 on the arm. As the pan leaves conveyor belt 17, its whole weight comes on to the swinging arm 18, which arm lowers down by gravity until it meets stop 34, and allows the pan to slide forward on to conveyor band 20. Guides 21 keep the pan in position and stop 22 on an oscillating arm 23 brings the pan to rest. The cam 24 timed to synchronize with the passage of the oven cradles underneath, lifts arm 23 which in turn releases the pan 11 and allows it to slide into the cradle 1 passing underneath as shown in Figure 8.

If it is found desirable to take out the pans from the cradles in the cooling conveyor, previous to them reaching the normal transfer position, then the cradles may be oscillated about their pivots whilst travelling downwards. Such oscillation is made possible by the movement of handle 25 (Figure 2) which through link 26 moves a portion of the guide track 27 which in turn throws the front end of the cradle forward and allows the pan to slide out on to shelf 27. Further, if it is desired to keep the pans in the oven cradles without being transferred to the cooler, then by throwing out the clutch lever 28 connecting the movement of lever 9 to the drive, the lever ceases to revolve and the pans are not lifted out on to conveyor 10, but continue moving forward in the cradle. The clutch lever 28 is interconnected through rods 29 and 30 to lever 31 which when moved prevents roller 16 coming into contact with projection 13 on the conveyor cradle, and at the same time fills up the gap 14 in the chain track so that the cradles 5 shall not tip up and the pans shall not be delivered from the cooler to the oven cradles.

It will consequently be seen that dough from a sheet mechanism or the like 35 of any desired type passing to a biscuit cutting or embossing machine 36, will be delivered by any usual fripping or the like mechanism to pans traversed beneath the delivery end 37 of this machine on the oven conveyor 3, and thence may be moved through an oven 38 in single or multiple flight, as is well known, to be subsequently transferred as described above to the cradles 5 of a conveyor 8 in a cooler 39 through which again they may be transferred, either in single or multiple flight, at the same time allowing when desired the oven 38 to work as an independent unit or again, the cooler 39 to be worked as an independent unit.

I declare that what I claim is:—

A plant for the manufacture of biscuits comprising in combination an oven, a cooler, a conveyor in said oven, a second conveyor in said cooler, means to convey pans from said oven conveyor to said cooler conveyor, means to deliver biscuits directly on to the pans of the oven conveyor, means to transfer said pans automatically back from the cooler conveyor to the oven conveyor, and control means putting out of action said transfer of pans from the cooler conveyor to the oven conveyor and means to allow discharge of pans from the cooler.

In witness whereof, I have hereunto signed my name this 21st day of March, 1930.

EDWARD MILNER CROSLAND.